US009193212B2

(12) United States Patent
Henry et al.

(10) Patent No.: US 9,193,212 B2
(45) Date of Patent: Nov. 24, 2015

(54) MARKER MAKER

(71) Applicant: Crayola LLC, Easton, PA (US)

(72) Inventors: Robert J. Henry, Bethlehem, PA (US);
David A. Cziraky, Bethlehem, PA (US);
Joseph Moll, Bethlehem, PA (US);
James Allen, Nazareth, PA (US)

(73) Assignee: Crayola, LLC, Easton, PA (US)

( * ) Notice: Subject to any disclaimer, the term of this patent is extended or adjusted under 35 U.S.C. 154(b) by 327 days.

(21) Appl. No.: 13/765,179

(22) Filed: Feb. 12, 2013

(65) Prior Publication Data

US 2014/0223720 A1  Aug. 14, 2014

(51) Int. Cl.
*B23P 19/04* (2006.01)
*B23P 19/12* (2006.01)
*B25B 11/02* (2006.01)
(Continued)

(52) U.S. Cl.
CPC . *B43K 15/00* (2013.01); *B43K 8/02* (2013.01);
*B43K 8/03* (2013.01); *B43K 11/005* (2013.01);
*B23P 11/00* (2013.01); *B23P 19/04* (2013.01);
*B23P 19/12* (2013.01); *B25B 11/02* (2013.01);
*B44D 3/08* (2013.01); *Y10T 29/49826*
(2015.01);
(Continued)

(58) Field of Classification Search
CPC .......... A46D 3/04; A46D 3/087; B23P 11/00;
B23P 19/00; B23P 19/02; B23P 19/04;
B23P 19/12; B25B 11/02; B30B 1/04; B30B
9/00; B30B 12/00; B43K 8/02; B43K 8/03;
B43K 11/00; B43K 11/005; B43K 15/00;
B43L 25/02; B44D 3/003; B44D 3/08; Y10T
29/49401; Y10T 29/49945; Y10T 29/49998;
Y10T 29/53443; Y10T 29/53474; Y10T
29/53896; Y10T 29/53987
See application file for complete search history.

(56) References Cited

U.S. PATENT DOCUMENTS 3,581,378 A *  6/1971  Jozens ............................ 29/429
5,895,160 A    4/1999  Ginelli
(Continued)

FOREIGN PATENT DOCUMENTS

EP         0564666 A1    10/1993
GB         2440731 A      2/2008
WO      2007102043 A1    9/2007

OTHER PUBLICATIONS

Instructables—Food Coloring Markers.pdf, by user "depotdevoid", available online Feb. 7, 2012, accessed Feb. 26, 2015, http://web.archive.org/web/20120207174316/http://www.instructables.com/id/Food-Coloring-Markers.*

(Continued)

*Primary Examiner* — Alexander P Taousakis
*Assistant Examiner* — Matthew P Travers
(74) *Attorney, Agent, or Firm* — Shook, Hardy & Bacon, L.L.P.

(57) ABSTRACT

A marker-making kit for assembling a marking device having a user-determined mixture of marking solution is provided. The kit includes a base unit coupled to a marker positioning mechanism and a press mechanism. A mixing tube holder secures a mixing tube used for collecting a desired amount of one or more marker fluids. A mixed marker solution is combined, including any number of different colors of marker fluid, and used to saturate a marker reservoir. The saturated reservoir may then be transferred to a maker barrel positioned near the press mechanism. By applying an amount of force with a marker compression arm, a completed marker is secured, enclosing the marker reservoir inside a marker barrel.

18 Claims, 11 Drawing Sheets

(51) Int. Cl.
  *B43K 8/02* (2006.01)
  *B43K 8/03* (2006.01)
  *B43K 11/00* (2006.01)
  *B43K 15/00* (2006.01)
  *B23P 11/00* (2006.01)
  *B44D 3/08* (2006.01)
(52) U.S. Cl.
  CPC ...... *Y10T 29/49998* (2015.01); *Y10T 29/53443* (2015.01); *Y10T 29/53474* (2015.01)

(56) References Cited

U.S. PATENT DOCUMENTS 6,655,551 B2 * 12/2003 Manne ................ 222/145.6
7,350,418 B2 * 4/2008 Kosmyna et al. ............ 73/726

OTHER PUBLICATIONS

International Search Report with Written Opinion mailed Apr. 30, 2014 in PCT Application No. PCT/US2014/015790, 8 pages.

* cited by examiner

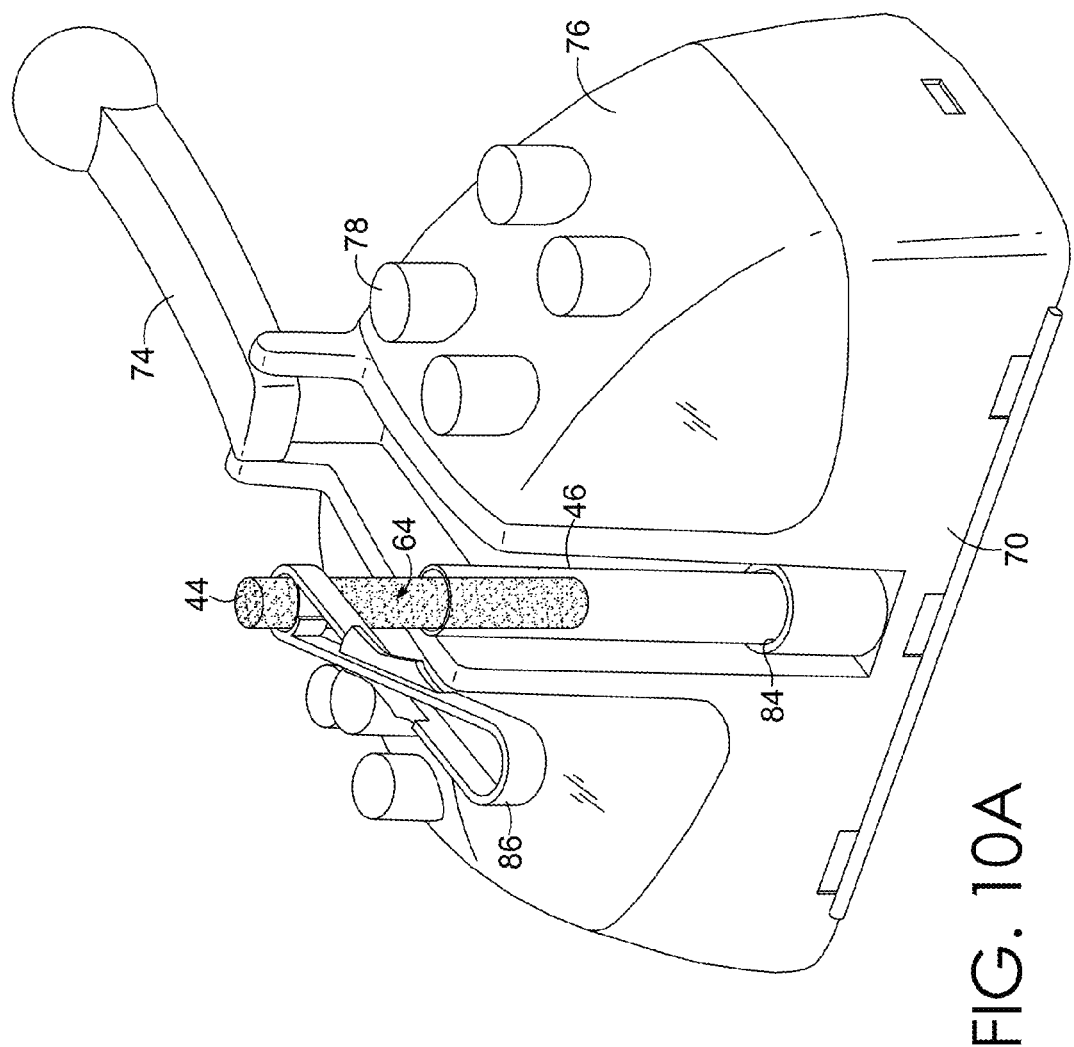

MARKER MAKER

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief and at a high level, this disclosure describes, among other things, a marker-making kit for assembling a customized marking device. The kit includes a base unit having a marker positioning mechanism and a press mechanism. The kit also includes marker reservoirs, barrels, nibs, and end plugs used to assemble a marking device. Additionally, the kit may provide mixing tubes and measuring cups for creating customized marker solutions that are applied to marker reservoirs.

DESCRIPTION OF THE DRAWINGS

Illustrative embodiments of the invention are described in detail below with reference to the attached drawing figures, and wherein:

FIG. 10A is an enlarged, perspective view of a portion of the marker-making kit of FIG. 6, in accordance with an embodiment of the invention;

DETAILED DESCRIPTION

Figure 1:
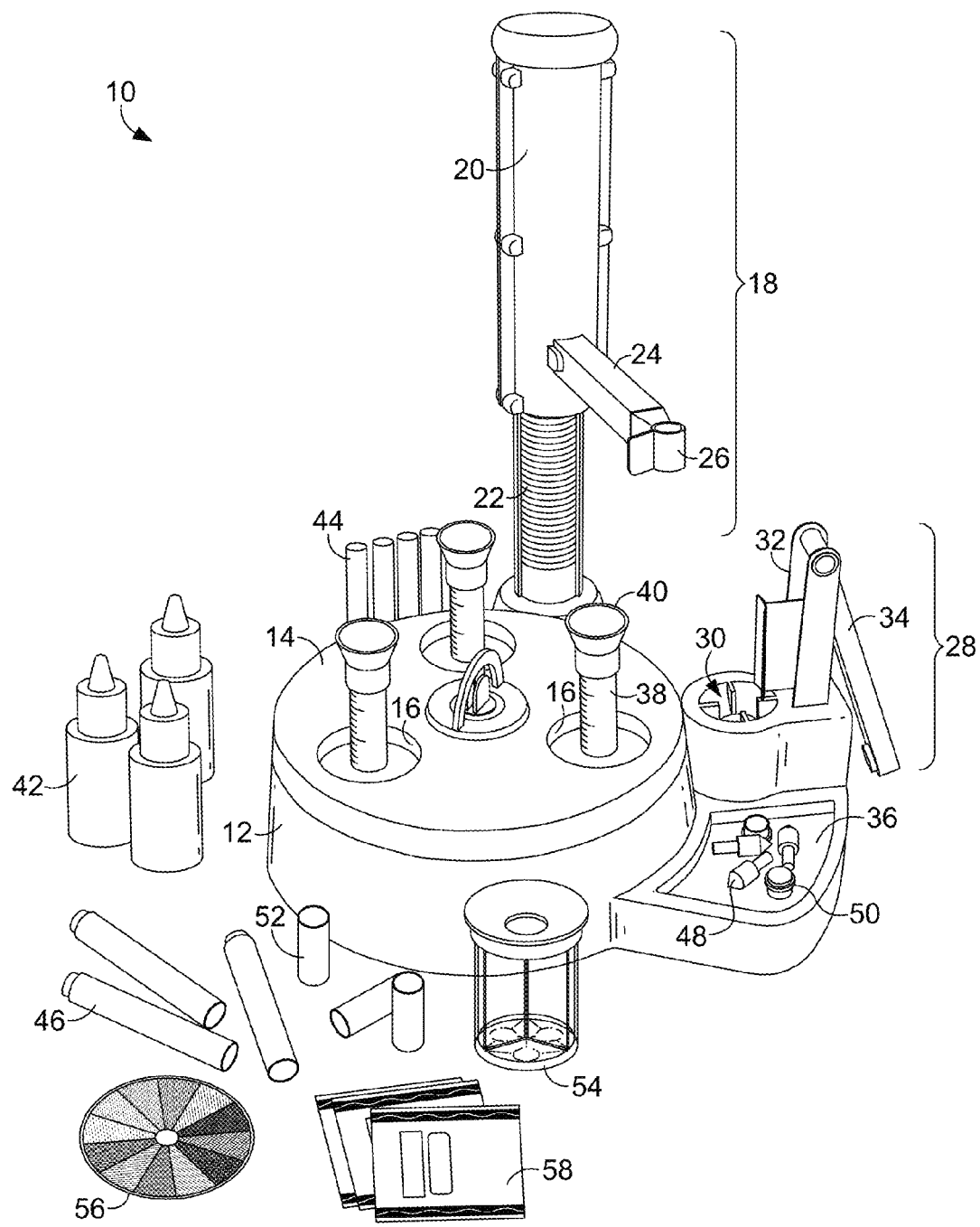
FIG. 1 is a perspective view of a marker-making kit, in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In one embodiment of the invention, a marker-making kit comprises: a base unit; one or more mixing tubes; one or more marker barrels; one or more marker nibs; one or more marker reservoirs; one or more end plugs; and a press mechanism coupled to the base unit, the press mechanism adapted to assemble a marker comprising one of the one or more marker barrels, one of the one or more marker nibs, one of the one or more marker reservoirs, and one of the one or more end plugs.

In another embodiment of the invention, a method of assembling a marking device comprises: dispensing an amount one or more marker fluids into a mixing tube to provide a mixed marker solution; saturating a marker reservoir with the mixed marker solution; securing the saturated marker reservoir inside a marker barrel; and assembling a marking device comprising the marker barrel securing the saturated marker reservoir, a marker nib, and a marker end plug.

In a further embodiment, a marker-making kit comprises: one or more mixing tubes; one or more marker barrels; one or more marker nibs; one or more marker reservoirs; one or more end plugs; a base unit comprising a plurality of storage compartments adapted to store at least one of the one or more mixing tubes, the one or more marker barrels, the one or more marker nibs, the one or more marker reservoirs, and the one or more end plugs; an articulating arm coupled to the base unit, the articulating arm adapted to rotatably maneuver a position of at least one of the one or more marker reservoirs relative to at least one of the one or more mixing tubes; and a press mechanism coupled to the base unit, the press mechanism adapted to assemble a marker comprising one of the one or more marker barrels, one of the one or more marker nibs, one of the one or more marker reservoirs, and one of the one or more end plugs, wherein the press mechanism comprises a compression arm and a marker positioner.

With reference initially to FIGS. 1-5, embodiments of the marker-making kit 10 includes a base unit 12 with a marker fluid color-mixing tray 14 having mixing-tube holders 16 on a surface of the mixing tray 14. The base unit 12 is coupled to a marker-positioning mechanism 18 having an articulating arm 20 that pivots about a height-adjustment support post 22. Articulating arm 20 is coupled to a marker pivot arm 24 and a marker pivot clip 26. Also coupled to the base unit 12 is a press mechanism 28, which in some embodiments includes marker compression positioner 30, compression support posts 32, and marker compression arm 34. As further depicted in FIG. 1, embodiments of the marker-making kit 10 include an accessory holder 36, a graduated-cylinder mixing tube 38, a plug-in funnel 40, a marker fluid bottle 42, a marker reservoir 44, a marker barrel 46, a marker nib 48, an end plug 50, a marker cap 52, a tri-chamber measuring cup 54, a color wheel mixing guide 56, and marker labels 58.

Figure 2:
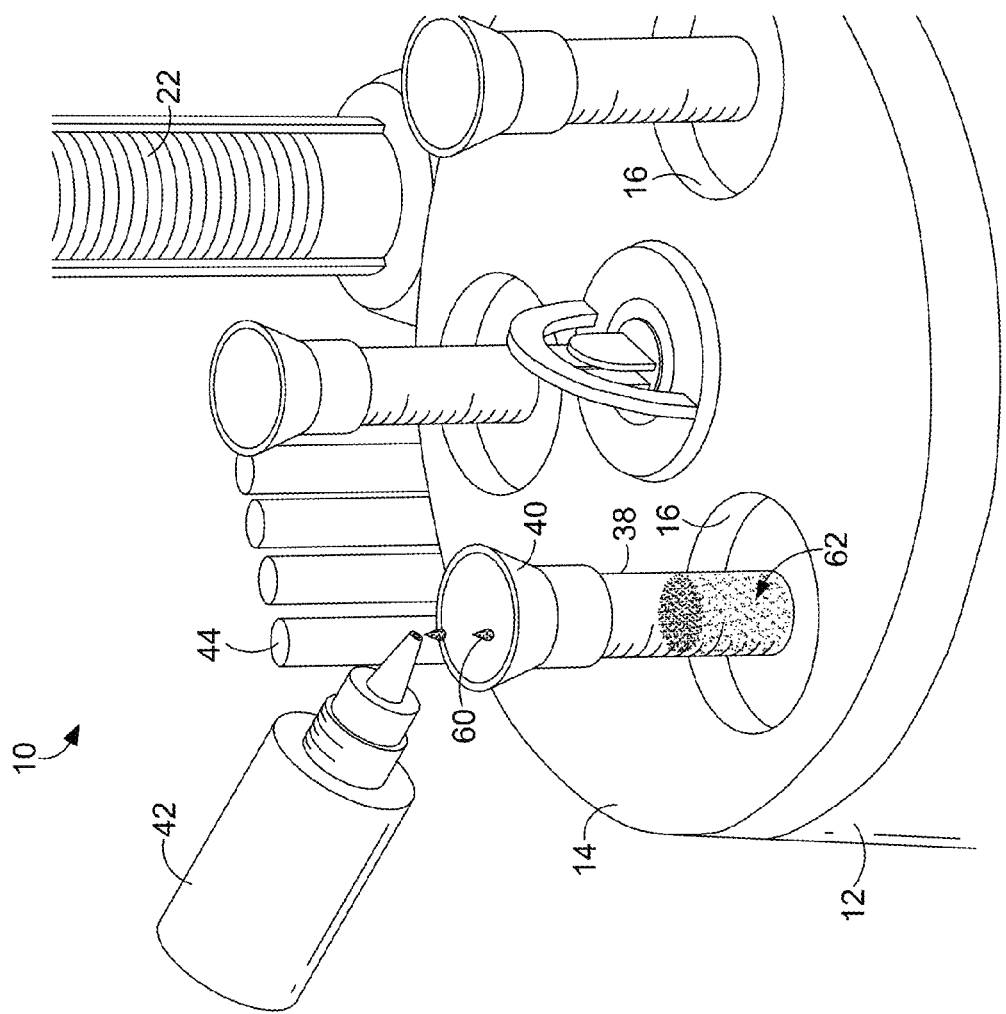
FIG. 2 is an enlarged, perspective view of a portion of the marker-making kit of FIG. 1, in accordance with an embodiment of the invention.

During marker assembly with the marker-making kit 10, mixing tube 38 is secured in an upright position by mixing-tube holder 16 on color-mixing tray 14. As depicted in FIG. 2, a user may fill the mixing tube 38 with marker fluid 60 from marker fluid bottle 42. Mixing tube 38 is depicted as including a plug-in funnel 40 at a top edge of the mixing tube 38, such that mixing tube 38 has a configuration similar to a graduated cylinder. As will be understood, mixing tube 38 may be any shape of container that accepts marker fluid 60, and facilitates the application of such solution to a marker reservoir 44. Accordingly, in some embodiments, mixing tube 38 and plug-in funnel 40 are combined into a single unit for containing marker fluid 60. In further embodiments, mixing tube 38 has a cylindrical shape without a separate, fluted edge.

In embodiments, marker fluid 60 may be any solution for marking on a surface, such as a washable ink solution, a non-washable ink solution, a permanent ink solution, a color-changing ink solution, an invisible-ink solution, and/or any other marker ink solution. Additionally, in embodiments, marker fluid 60 may be any color of marker ink solution, and multiple different marker fluid bottles 42 may include multiple different colors of marker fluids 60. In one example, the marker-making kit 10 includes a blue washable ink solution in a first marker fluid bottle 42, a red washable ink solution in a second marker fluid bottle 42, and a yellow washable ink solution in a third marker fluid bottle 42. Accordingly, embodiments of the marker-making kit 10 include one or more marker fluid bottles 42 for dispensing a customized amount of marker fluid 60 into a mixing tube 38.

In embodiments, based on receiving marker fluid 60 from one marker fluid bottle 42, or receiving different colors of marker fluid 60 from multiple marker fluid bottles 42, a mixed marker solution 62 fills at least a portion of the mixing tube 38. Accordingly, mixed marker solution 62 may include any number of different colors of marker fluid 60, or a single color of marker fluid 60, that are dispensed into the mixing tube 38. For example, mixed marker solution 62 may include a first quantity of a first marker fluid 60 from a first marker fluid bottle 42 (such as a blue washable ink solution) as well as a second quantity of a second marker fluid 60 from a second marker fluid bottle 42 (such as a red washable ink solution). In embodiments, marker-making kit 10 includes a color wheel mixing guide 56 that indicates recommended ink colors for mixing together while preparing the mixed marker solution 62.

Figure 3:
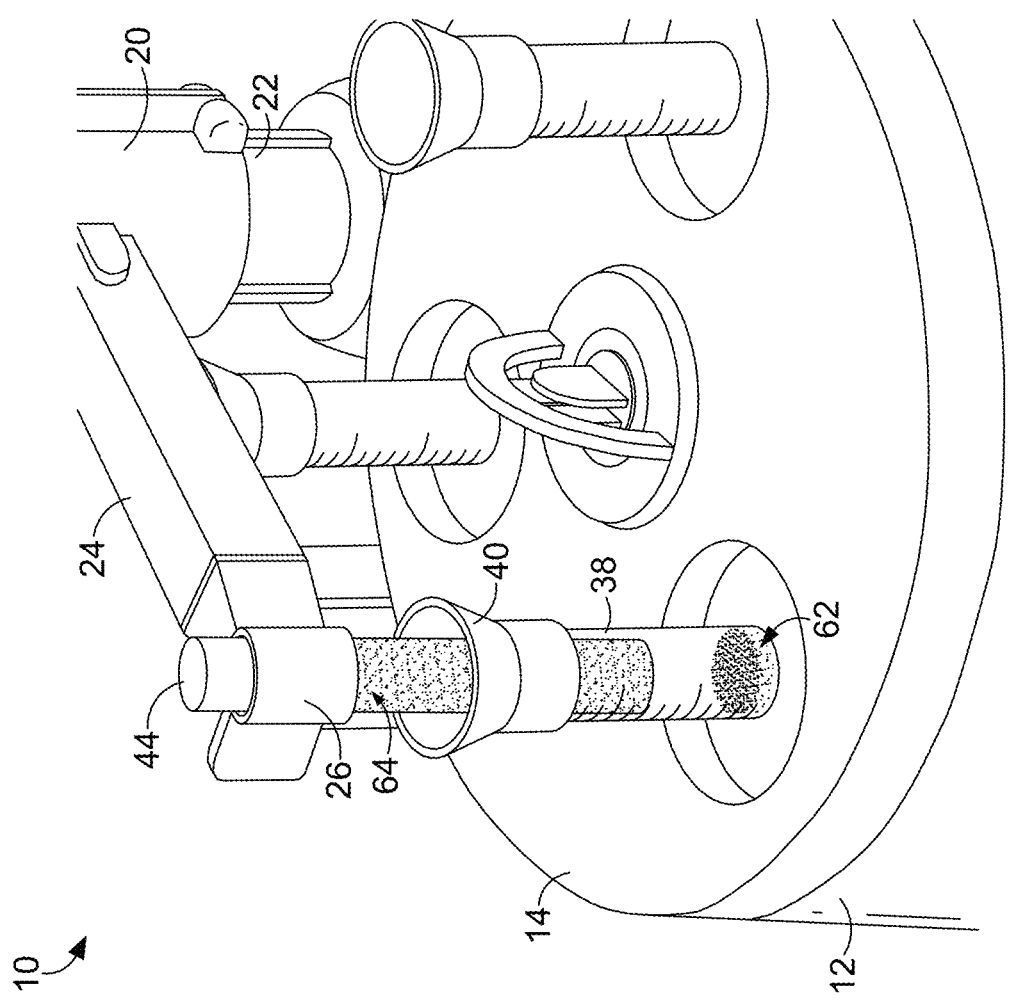
FIG. 3 is an enlarged, perspective view of a portion of the marker-making kit of FIG. 1, in accordance with an embodiment of the invention.

Turning now to FIG. 3, having collected a quantity of marker fluid 60 inside the mixing tube 38, a marker reservoir 44 may be submerged into mixed marker solution 62. In embodiments, the marker pivot clip 26 secures the marker reservoir 44 to an end of the marker pivot arm 24 for maneuvering of the marker reservoir 44 by the articulating arm 20. In one example, the articulating arm 20 may be raised and lowered with respect to the height adjustment support post 22. In some embodiments, the marker-positioning mechanism 18 is spring-loaded, which allows a user to dip a marker reservoir 44 in and out of a mixing tube 38. For example, articulating arm 20 may be spring loaded for movement with respect to the height-adjustment support post 22, such that pressure applied against or removed from at least a portion of the marker-positioning mechanism 18 allows gradual raising and lowering of a marker reservoir 44 into a mixed marker solution 62. In embodiments, the spring-loaded feature of the marker-positioning mechanism 18 permits movement with respect to particular positions of the base unit 12 and/or color-mixing tray 14. For example, when the marker pivot arm 24 of the articulating arm 20 is pivoted to a particular location with respect to the color-mixing tray 14, then the marker-positioning mechanism 18 may enable spring-loaded movement of the device to allow dipping of a marker reservoir 44 into a mixing tube 38. As such, the spring-loaded movement (i.e. raising and lowering of the reservoir 44) may be permitted, in some embodiments, when a mixing tube holder 16 is vertically aligned with a marker pivot clip 26.

In some embodiments, the articulating arm 20 may also rotate about the height adjustment support post 22, thereby moving the marker reservoir 44 between a variety of positions with respect to the base unit 12. For example, the articulating arm 20 may be used to rotate the marker reservoir 44 from a first position near the mixing tubes 38 on color-mixing tray 14, to a second position near the press mechanism 28. In embodiments, the articulating arm 20 may be used to manipulate the marker reservoir 44 from submersion inside the mixing tube 38, to hovering above the mixing tray 14, to securing inside a marker barrel 46.

In embodiments, color-mixing tray 14 may be secured into one of a plurality of positions with respect to the base unit 12 such that, in each position, one of the mixing tube holders 16 is aligned directly below the marker pivot clip 26 (with the articulating arm 20 in a first position). For example, the articulating arm 20 may be maneuvered into a first position, with the marker pivot clip 26 aligned over a first mixing tube holder 16, based on a first position of the color-mixing tray 14. The color-mixing tray 14 may then be rotated with respect to the base unit 12 and engaged in a second position, such that a second mixing tube holder 16 is now aligned with the marker pivot clip 26. In a further example, the color-mixing tray 14 may again be rotated with respect to the base unit 12 and engaged in a third position, such that a third mixing tube holder 16 is aligned with the marker pivot clip 26. In some embodiments, the color-mixing tray 14 may be engaged into one of multiple different positions with respect to the base unit 12 using detents in one or both of the color-mixing tray 14 and base unit 12. As such, detents on either component may stop the rotation of the color-mixing tray 14 to align a mixing tube 38 (secured by a mixing tube holder 16) with a reservoir 44 (secured by the marker pivot clip 26).

As shown in FIG. 3, the articulating arm 20 may lower the marker reservoir 44 into the mixing tube 38, to provide a saturated reservoir 64 of mixed marker solution 62. As will be understood, "saturation" of the marker reservoir 44 is not meant to imply that all of the mixed marker solution 62 is absorbed by the reservoir 44, or that the entire marker reservoir 44 is fully saturated by all of the mixed marker solution 62. Instead, only a small amount of mixed marker solution 62 may be absorbed by reservoir 44, based at least in part upon the amount of time the marker reservoir 44 is submerged in the solution. Accordingly, a saturated reservoir 64 may include any amount of a mixed marker solution 62 that is absorbed into a marker reservoir 44.

Figure 4:
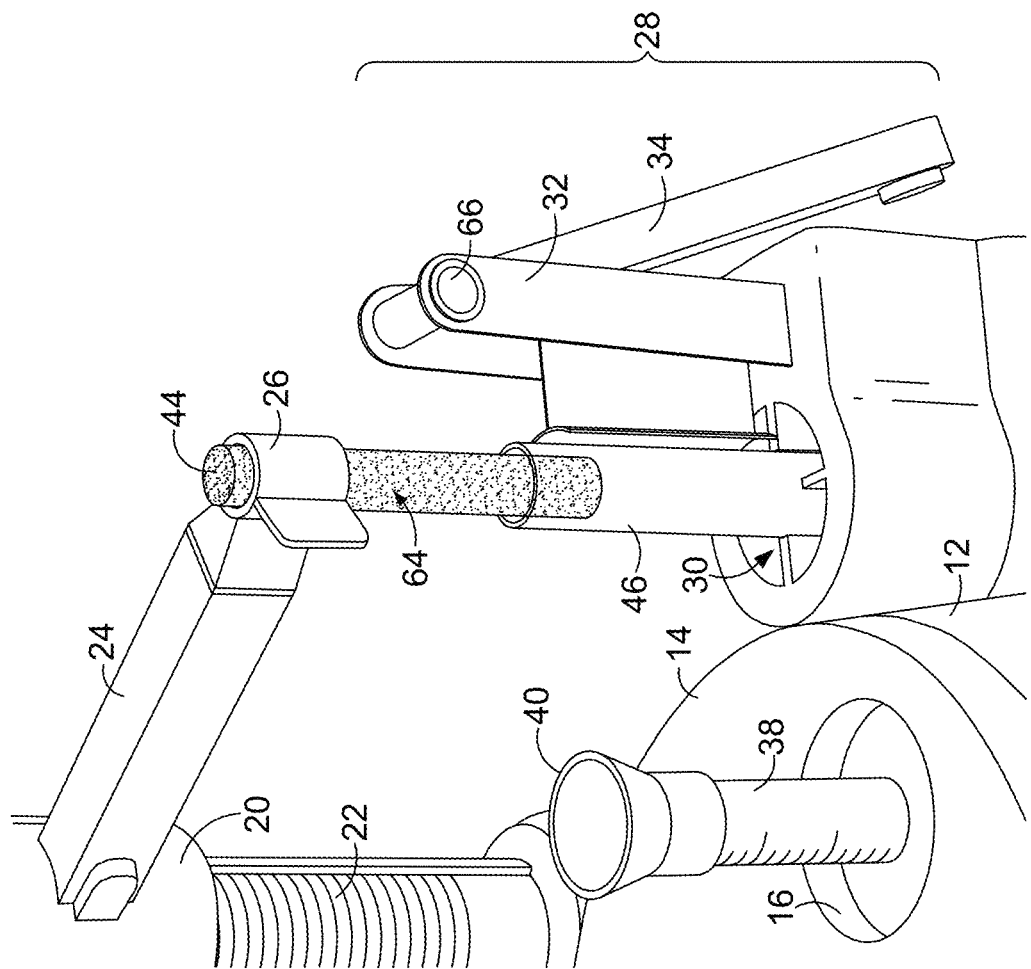
FIG. 4 is an enlarged, perspective view of a portion of the marker-making kit of FIG. 1, in accordance with an embodiment of the invention.

As shown in FIG. 4, the saturated reservoir 64 may be maneuvered by the marker positioning mechanism 18 into orientation with a press mechanism 28. In one example, the user may lower the saturated reservoir 64 into a marker barrel 46 that is secured by the marker compression positioner 30. In some embodiments, in addition to placing the saturated reservoir 64 inside the marker barrel 46, a user may also position a marker nib 48 inside the marker barrel 46, with the marker nib 48 being coupled directly or indirectly to the saturated reservoir 64. Accordingly, in some embodiments, one or more additional marker components may be combined with the saturated reservoir 64 inside the marker barrel 46. As such, marker barrel 46 may be configured to accept any number or configuration of additional marker components such that the saturated reservoir 64 and additional components are secured by the marker barrel 46. In one embodiment, marker nib 48 may be a single nib unit, or multiple units, that provide for the transfer of mixed marker solution 62 from the saturated reservoir 64 onto a writing surface, such as a piece of paper. In further embodiments, marker nib 48 may be a traditional marker nib, a conical marker nib, a Crayola® Crazy Tips marker nib, and/or a Crayola® Bullet marker component.

Figure 5:
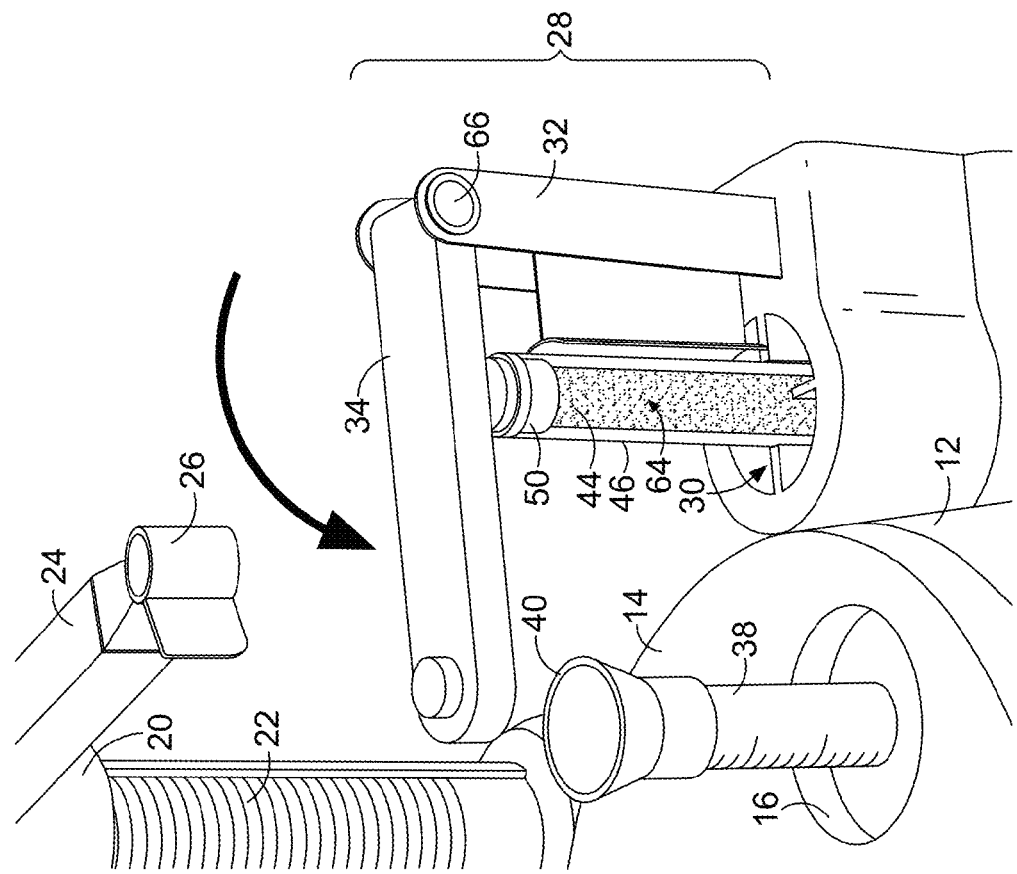
FIG. 5 is an enlarged, perspective view of a portion of the marker-making kit of FIG. 1, in accordance with an embodiment of the invention.

In FIG. 5, an end plug 50 is placed at an end of the marker barrel 46. As such, the marker compression arm 34 is moved from a first position (depicted in FIG. 4) to a second position (depicted in FIG. 5). In the second position, the marker compression arm 34 secures the end plug 50 onto the end of the marker barrel 46, and completes the assembly of the marker barrel 46 enclosing a customized, saturated reservoir 64. In some embodiments, a user may then attach a marker cap 52 to the opposite end of the marker barrel 46 from where the end cap 50 was secured, to further enclose the marker reservoir 44 and/or marker nib 48. Additionally, once a marker is assembled, a user may apply a marker label 58 to an exterior surface of the marker.

Figure 6:
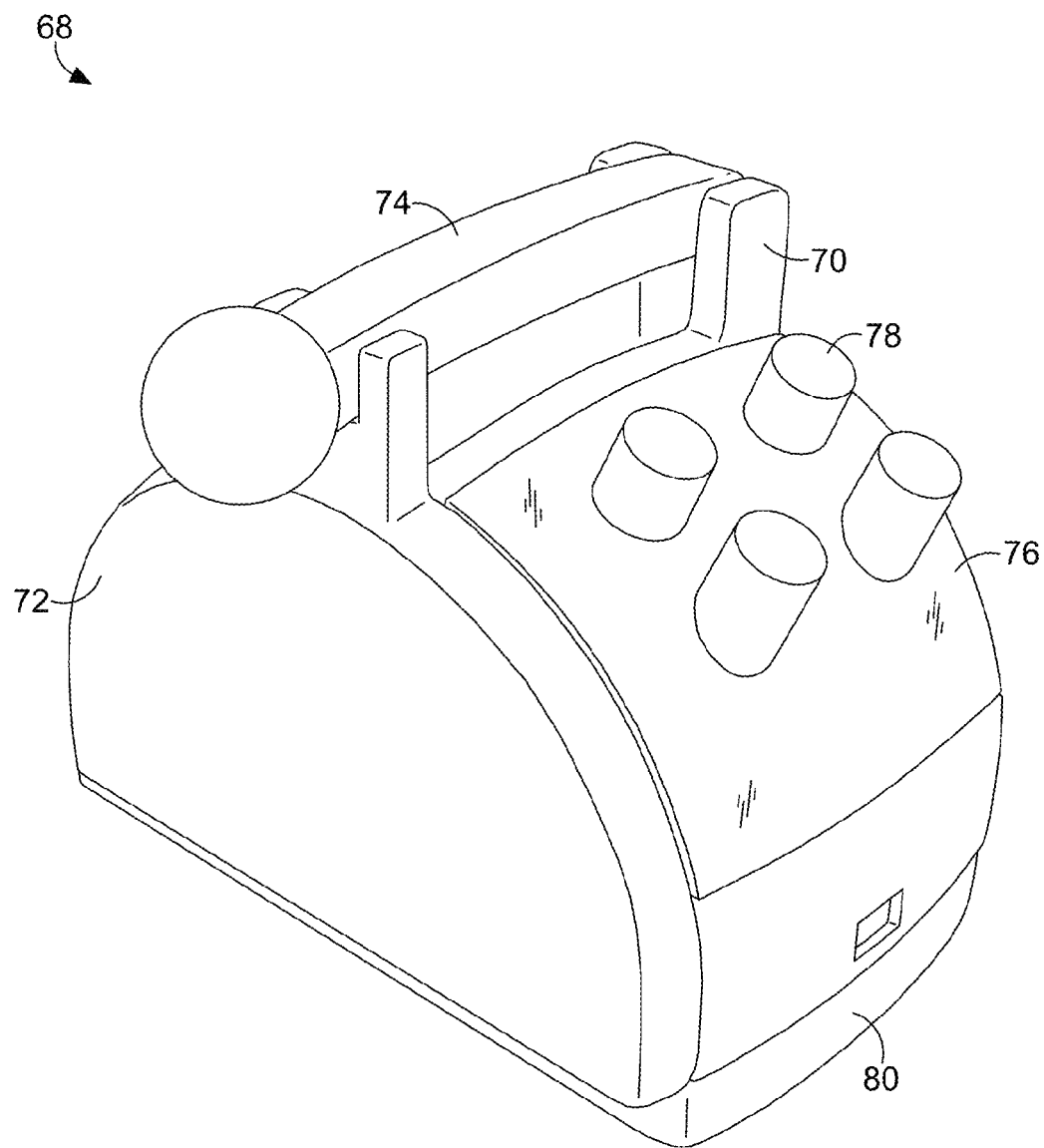
FIG. 6 is a perspective view of a marker-making kit, in accordance with an embodiment of the invention.
Figure 7:
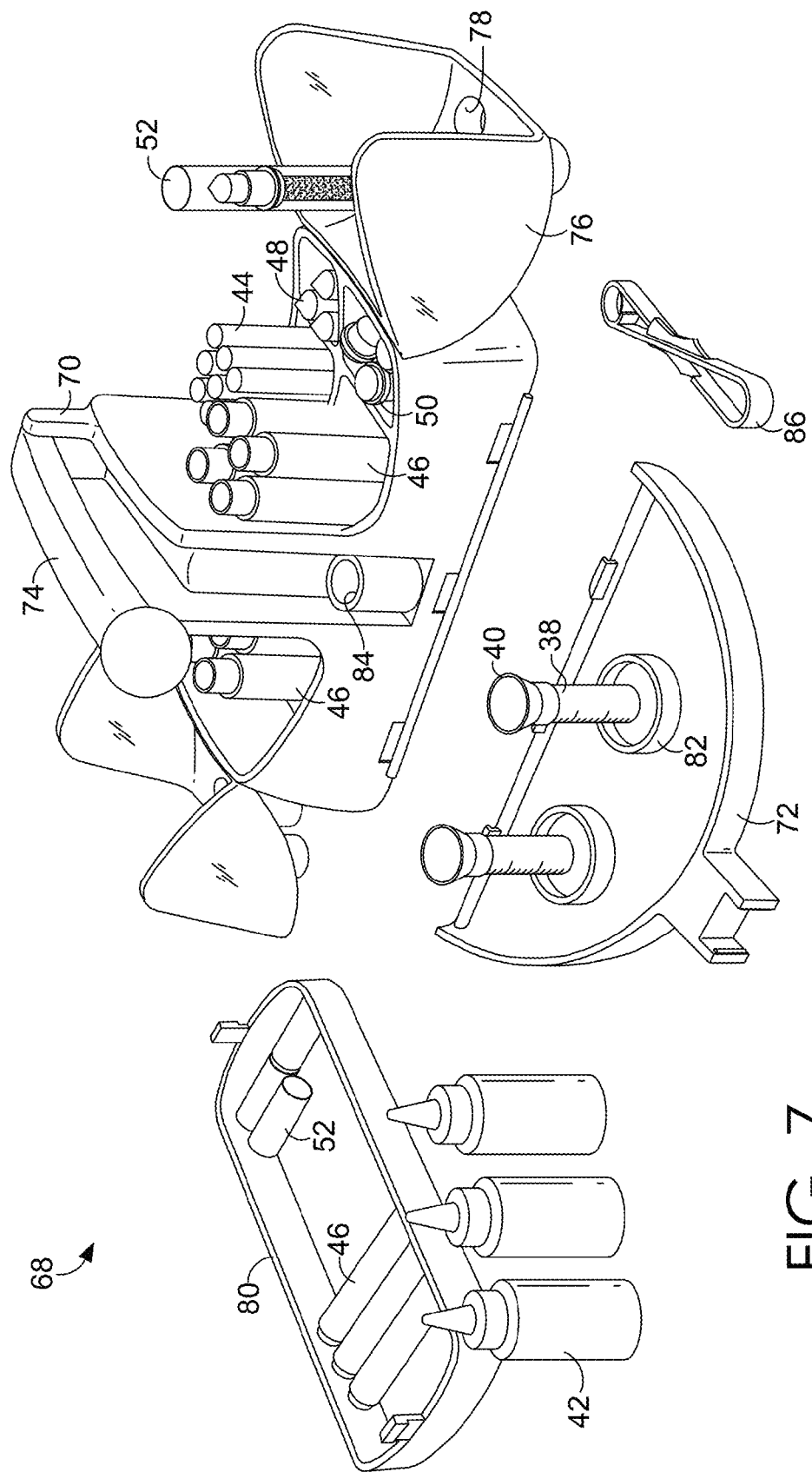
FIG. 7 is a perspective view of the marker-making kit of FIG. 6, in accordance with an embodiment of the invention.

Turning now to FIG. 6, in another embodiment of the invention, a marker-making kit 68 includes a base unit 70, a color-mixing tray 72, a compression arm 74, a side tray 76, a marker holder 78, and a bottom tray 80. In the expanded view of FIG. 7, the marker-making kit 68 includes mixing tube holders 82, a marker compression positioner 84, and reservoir tweezers 86. Similar to marker-making kit 10, the marker-making kit 68 may also include mixing tubes 38, plug-in funnels 40, marker reservoirs 44, marker barrels 46, marker nibs 48, end caps 50, and marker cap 52. As shown in FIGS. 6-7, the bottom tray 80 of the marker-making kit 68 may be removed from a bottom surface of the base unit 70, and may include one or more marker barrels 46, and one or more marker caps 52. Further, mixing tube holders 82 on a surface of the color-mixing tray 72 serve to support one or more mixing tubes 38, while completed markers may be positioned inside the marker holder 78 of the side tray 76. As shown in FIGS. 6-7, color-mixing tray 72 may be removed from a side surface of the base unit 70, and the side tray 76 may be pivoted away from the base unit 70 into an open position.

Figure 8:
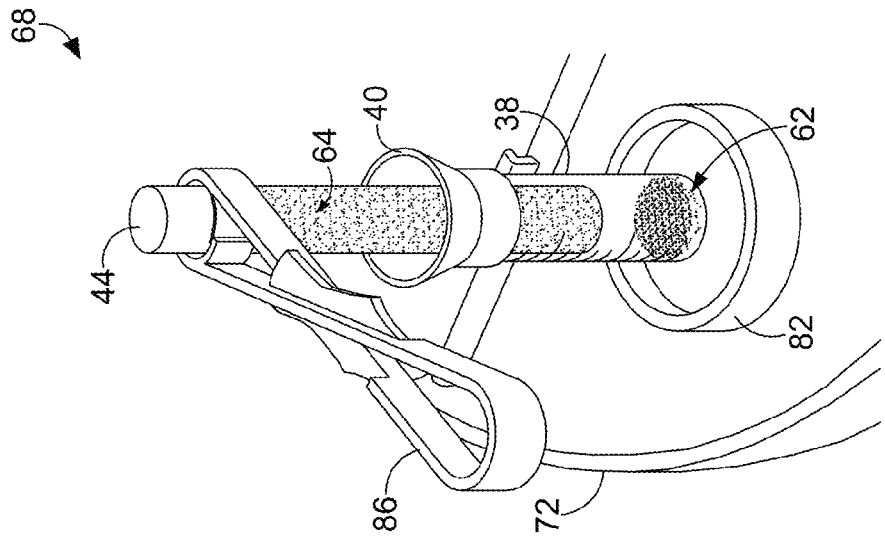
FIG. 8 is an enlarged, perspective view of a portion of the marker-making kit of FIG. 6, in accordance with an embodiment of the invention.

With reference now to FIG. 8, marker fluid 60 may be dispensed from a marker fluid bottle 42 into a mixing tube 38 to provide a mixed marker solution 62. As discussed above with reference to marker-making kit 10, the mixed marker solution 62 may include any number of colors of marker ink solutions, including a single or multiple colors of ink. In one example, the mixed marker solution 62 includes multiple washable ink solutions that are mixed together to form a consistent mixed marker solution 62.

Figure 9:
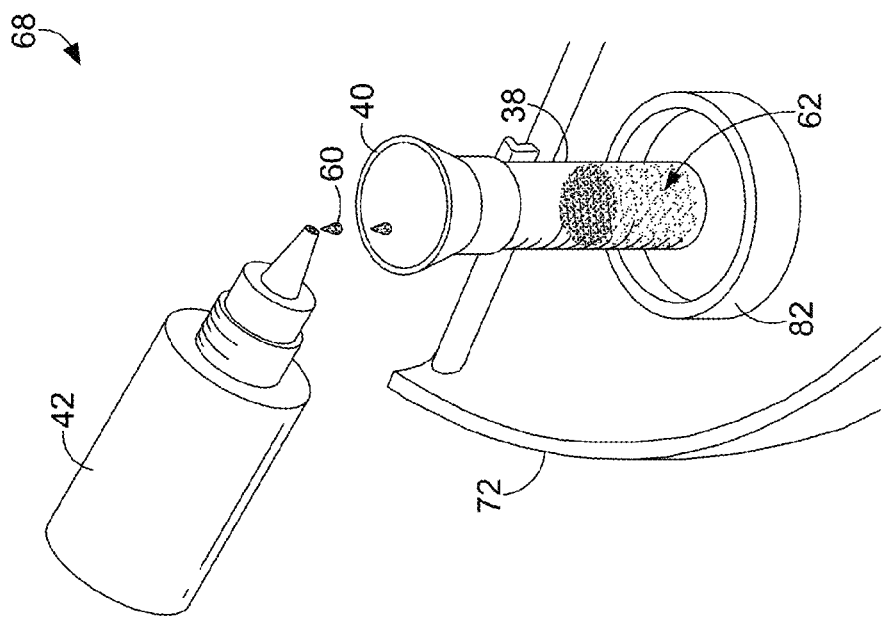
FIG. 9 is an enlarged, perspective view of a portion of the marker-making kit of FIG. 6, in accordance with an embodiment of the invention.

In FIG. 9, a marker reservoir 44 is submerged into the mixed marker solution 62 using the reservoir tweezers 86. As such, while embodiments of the marker-making kit 10 utilizes a marker-positioning mechanism 18 to maneuver the marker reservoir 44, the marker-making kit 68 provides a pair of reservoir tweezers 86 that couple to the marker reservoir 44. Embodiments of the reservoir tweezers 86 may be molded from a single unit such that a crossed-over mechanism provides a permanent "gripping" action against a marker reservoir 44. For example, a holding portion opens when pressure is applied to the body of the reservoir tweezers 86, and the reservoir tweezers 86 return to a gripping position when pressure is released.

Figure 10B:
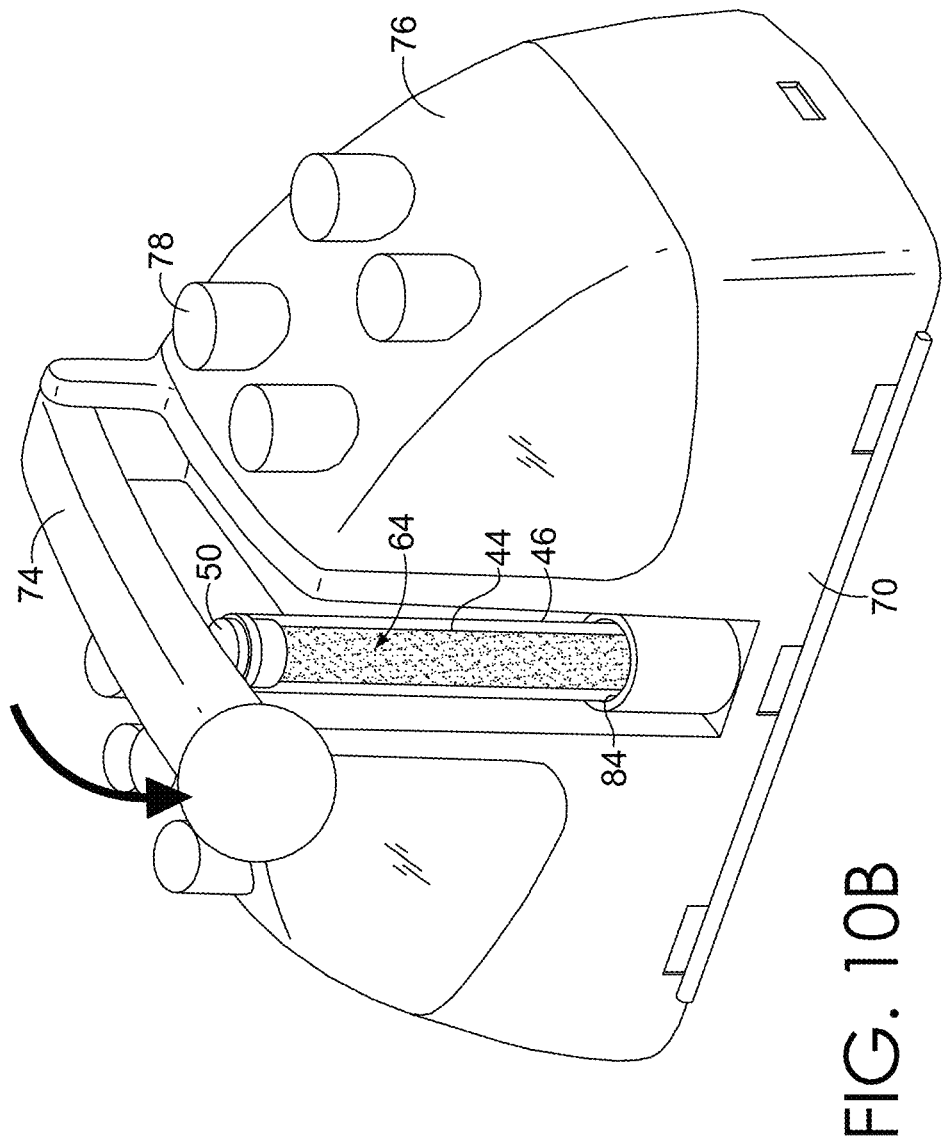
FIG. 10B is an enlarged, perspective view of a portion of the marker-making kit of FIG. 6, in accordance with an embodiment of the invention.

Having submerged marker reservoir 44 into the mixed marker solution 62, the saturated reservoir 64 is then lowered into a marker barrel 46, as depicted in FIG. 10A. In some embodiments, marker barrel 46 may be secured by the marker compression positioner 84 for compression by the compression arm 74. Compression arm 74 is in a first position in FIG. 10A, and a second position in FIG. 10B. Accordingly, in the second position, compression arm 74 may be used to apply force against the end plug 50, and marker barrel 46. In embodiments, securing end plug 50 into an end of the marker barrel 46 completes the assembly of the marker barrel 46 enclosing a customized, saturated reservoir 64.

Figure 12:
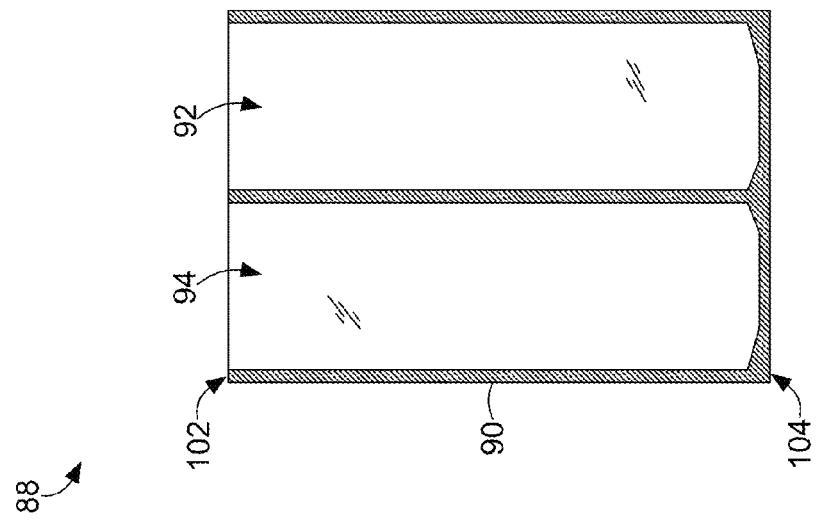
FIG. 12 is a cross-sectional view of the tri-chamber measuring cup of FIG. 11, in accordance with an embodiment of the invention.
Figure 11:
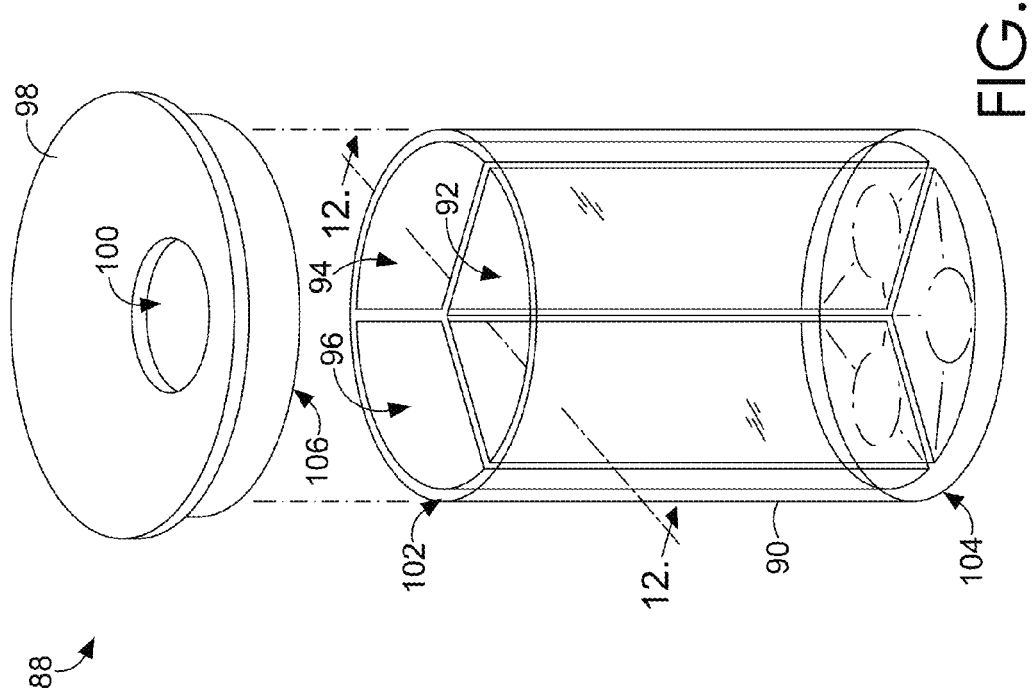
FIG. 11 is perspective view of a tri-chamber measuring cup, in accordance with an embodiment of the invention.

With reference to FIG. 11, a tri-chamber measuring cup 88 may be used with one or both of the marker-making kit 10 and the marker making kit 68. Embodiments of the tri-chamber mixing cup 88 include a cup housing 90 having a first chamber 92, a second chamber 94, and a third chamber 96. As will be understood, the mixing cup 88 may include any number of chambers to provide a multi-chamber mixing cup, such as a four-chambered mixing cup. A mixing cup cap 98 having an opening 100 may be coupled to a first end 102 of the cup housing 90. In embodiments, the second end 104 of the cup housing 90 may be positioned inside a mixing tube holder 16 (as shown in FIG. 1) and/or a mixing tube holder 82 (as shown in FIG. 7). In further embodiments, each of the first, second, and third chambers 92, 94, and 96 are individually contained, as partially-depicted in the cross-sectional view of FIG. 12.

During marker assembly, a user may remove the mixing cup cap 98 and pour a first quantity of a first marker fluid into the first chamber 92, a second quantity of a second marker fluid into the second chamber 94, and a third quantity of a third marker fluid into the third chamber 96. Having dispensed a desired amount of each marker fluid (such as a particular amount of three different colors of inks), the user may attach the mixing cup cap 98 to the cup housing 90, and pour the combined solution of three marker fluids into a single mixing tube 38 via the opening 100.

In another embodiment, the tri-chamber measuring cup 88 may be used to mix multiple marker fluids in each of the three individual chambers 94, 94, and 96, such that three marker reservoirs 44 may absorb separate mixed marker solutions 62 at the same time. For example, two different mixed fluids 60 may be combined to form a mixed markers solution 62 in each of the three chambers 92, 94, and 96. As such, a user may manipulate multiple marker fluids 60 to form a variety of mixed marker solutions 62 prior to application of such solutions by multiple reservoirs 44.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A marker-making kit for assembling a customized marking device comprising:
   a base unit;
   one or more mixing tubes;
   one or more marker barrels;
   one or more marker nibs;
   one or more marker reservoirs;
   one or more end plugs;
   a press mechanism coupled to the base unit, the press mechanism adapted to assemble a marker comprising one of the one or more marker barrels, one of the one or more marker nibs, one of the one or more marker reservoirs, and one of the one or more end plugs, wherein the press mechanism is configured to be moved by a user from a first position to a second position relative to the marker being assembled; and a color-mixing tray removably coupled to the base unit, the color-mixing tray having one or more mixing tube holders.

2. The kit of claim 1, wherein the base unit comprises a plurality of storage compartments adapted to store at least one of the one or more mixing tubes, the one or more marker barrels, the one or more marker nibs, the one or more marker reservoirs, and the one or more end plugs.

3. The kit of claim 1, wherein the base unit comprises a color mixing tray adapted to position at least one of the one or more mixing tubes for filling with marker fluid.

4. The kit of claim 1, wherein the base unit comprises a storage well.

5. The kit of claim 1, wherein the one or more mixing tubes comprise one or more of a graduated cylinder and a plug-in funnel that couples to an end of the graduated cylinder.

6. The kit of claim 1, wherein the kit further comprises:
a marker positioning mechanism coupled to the base unit, the marker positioning unit comprising an articulating arm adapted to rotatably maneuver a position of at least one of the one or more marker reservoirs relative to the base unit.

7. The kit of claim 6, wherein rotatably maneuvering the position of at least one of the one or more marker reservoirs comprises rotating a marker reservoir around a central longitudinal axis of the articulating arm and raising and lowering the position of at least one of the one or more marker reservoirs relative to a horizontal plane of the base unit.

8. The kit of claim 6, wherein the marker positioning mechanism comprises a marker pivot arm having a marker pivot clip adapted to secure the position of the at least one of the one or more marker reservoirs during maneuvering.

9. The kit of claim 1, wherein the kit further comprises one or more of the following:
one or more marker fluid bottles;
one or more marker labels;
one or more color wheel mixing guides; and
one or more marker caps.

10. The kit of claim 1, further comprising a tri-chamber measuring cup adapted to receive and dispense marker fluid.

11. The kit of claim 1, further comprising one or more pivotable side trays attached to the base unit, the side trays configured to store one or more completed markers.

12. A marker-making kit comprising:
one or more mixing tubes;
one or more marker barrels;
one or more marker nibs;
one or more marker reservoirs;
one or more end plugs;
a base unit comprising a plurality of storage compartments adapted to store at least one of the one or more mixing tubes, the one or more marker barrels, the one or more marker nibs, the one or more marker reservoirs, and the one or more end plugs, and further comprising a marker fluid color-mixing tray having mixing tube holders on a surface of the mixing tray;
an articulating arm coupled to the base unit, the articulating arm adapted to rotatably maneuver a position of at least one of the one or more marker reservoirs relative to at least one of the one or more mixing tubes; and
a press mechanism coupled to the base unit configured to be moved by a user from a first position to a second position relative to a marker being assembled, the press mechanism adapted to assemble the marker comprising one of the one or more marker barrels, one of the one or more marker nibs, one of the one or more marker reservoirs, and one of the one or more end plugs, wherein the press mechanism comprises a compression arm and a marker positioner.

13. The kit of claim 12, wherein rotatably maneuvering the position of at least one of the one or more marker reservoirs comprises rotating a marker reservoir around a central longitudinal axis of the articulating arm and raising and lowering the position of at least one of the one or more marker reservoirs relative to a horizontal plane of the base unit.

14. The kit of claim 13, wherein the articulating arm is spring-loaded for movement relative to the base unit.

15. The kit of claim 12, further comprising one or more of the following:
one or more marker fluid bottles;
one or more marker labels;
one or more color wheel mixing guides; and
one or more marker caps.

16. The kit of claim 15, wherein the marker fluid is any solution for marking on a surface selected from one of a washable ink solution, a non-washable ink solution, a permanent ink solution, a color-changing ink solution, and an invisible-ink solution.

17. The kit of claim 12 further comprising a tri-chamber measuring cup adapted to receive a plurality of marker fluids and dispense the plurality of marker fluids into at least one of the one or more mixing tubes.

18. The kit of claim 12, wherein a marker is assembled using the kit based on:
1) dispensing an amount one or more marker fluids into one of the one or more mixing tubes to provide a mixed marker solution;
2) saturating one of the one or more marker reservoirs with the mixed marker solution;
3) securing the saturated marker reservoir inside one of the one or more marker barrels; and
4) assembling the marking device comprising the marker barrel securing the saturated marker reservoir, one of the one or more marker nibs, and one of the one or more end plugs.

* * * * *